(12) United States Patent
Bodke (10) Patent No.: US 8,782,792 B1
(45) Date of Patent: Jul. 15, 2014

(54) SYSTEMS AND METHODS FOR DETECTING MALWARE ON MOBILE PLATFORMS

(75) Inventor: Anand Bodke, Pune (IN)

(73) Assignee: Symantec Corporation, Mountain View, CA (US)

( * ) Notice: Subject to any disclaimer, the term of this patent is extended or adjusted under 35 U.S.C. 154(b) by 105 days.

(21) Appl. No.: 13/282,709

(22) Filed: Oct. 27, 2011

(51) Int. Cl.
  *H04L 29/06* (2006.01)
(52) U.S. Cl.
  USPC .............. 726/24; 713/187; 713/188; 713/189
(58) Field of Classification Search
  USPC .......................................................... 726/24
  See application file for complete search history.

(56) References Cited

U.S. PATENT DOCUMENTS

| 8,321,936 | B1* | 11/2012 | Green et al. | 726/23 |
| 2003/0101381 | A1* | 5/2003 | Mateev et al. | 714/38 |
| 2005/0187740 | A1* | 8/2005 | Marinescu | 703/1 |
| 2008/0047023 | A1* | 2/2008 | Lam et al. | 726/30 |
| 2008/0263659 | A1* | 10/2008 | Alme | 726/22 |
| 2009/0031403 | A1* | 1/2009 | Huang | 726/4 |
| 2009/0036111 | A1* | 2/2009 | Danford et al. | 455/419 |
| 2009/0044024 | A1* | 2/2009 | Oberheide et al. | 713/188 |
| 2009/0126016 | A1* | 5/2009 | Sobko et al. | 726/23 |
| 2010/0313270 | A1* | 12/2010 | Kim et al. | 726/24 |
| 2011/0060947 | A1* | 3/2011 | Song et al. | 714/37 |

OTHER PUBLICATIONS

Dai et al., Behavior-Based Malware Detection on Mobile Phone, Sep. 2010, 6th International Conference on Wireless Communications Networking and Mobile Computing, pp. 1-4.*

* cited by examiner

*Primary Examiner* — Morshed Mehedi
*Assistant Examiner* — Kenneth Chang
(74) *Attorney, Agent, or Firm* — ALG Intellectual Property, LLC (57) ABSTRACT

A computer-implemented method for detecting malware on mobile platforms may include (1) identifying an application on a mobile computing platform subject to a malware evaluation, (2) transmitting the application to a security server, (3) providing emulation information to the security server, the emulation information relating to emulating the mobile computing platform, (4) receiving a result of the malware evaluation as performed by the security server, the malware evaluation including the security server using the emulation information to execute the application within an emulation of the mobile computing platform, and (5) performing a security action based on the result of the malware evaluation. Various other methods, systems, and computer-readable media are also disclosed.

20 Claims, 6 Drawing Sheets

SYSTEMS AND METHODS FOR DETECTING MALWARE ON MOBILE PLATFORMS

BACKGROUND

With the rise of mobile computing, consumers may now access the Internet from anywhere. Mobile computing devices such as cellular telephones, tablet computers, e-book readers, and the like have become a ubiquitous part of everyday life. However, the ability to access the Internet from these devices also brings the various dangers of the Internet to these devices. Untrusted sources for mobile applications may offer malicious applications for download. Furthermore, trusted sources, such as digital distribution platforms (or "application stores") for some mobile platforms may sometimes inadvertently host malware. Additionally, malicious web pages may exploit vulnerabilities in web browser software that may allow malware to be downloaded to a user's mobile computing device.

Traditional computing security solutions may include installing system-level software, such as anti-virus software, on a computing system to monitor activity on the computing system and block, quarantine, and/or eradicate the variety of threats available through an Internet connection. However, some mobile computing platforms are restricted and/or closed, discouraging and/or preventing users from installing software of their choice and/or from installing system-level software that would provide sufficient access for security software to operate effectively. Furthermore, some anti-malware techniques may be resource intensive, potentially harming the performance of a mobile device. Accordingly, the instant disclosure identifies a need for additional and improved systems and methods for detecting malware on mobile platforms.

SUMMARY

As will be described in greater detail below, the instant disclosure generally relates to systems and methods for detecting malware on mobile platforms by uploading suspect applications to a cloud-based security system where the suspect applications may be run in mobile-platform emulators and inspected for suspect behaviors. In one example, a computer-implemented method for detecting malware on mobile platforms may include (1) identifying an application on a mobile computing platform subject to a malware evaluation, (2) transmitting the application to a security server, (3) providing emulation information to the security server, the emulation information relating to emulating the mobile computing platform, (4) receiving a result of the malware evaluation as performed by the security server, the malware evaluation including the security server using the emulation information to execute the application within an emulation of the mobile computing platform, and (5) performing a security action based on the result of the malware evaluation.

In some examples, providing the emulation information to the security server may include providing information identifying the mobile computing platform. In one example, the malware evaluation may include the security server performing a behavioral analysis on the application executing within the emulation of the mobile computing platform. In some examples, the malware evaluation may include scanning the application for at least one malware signature, checking the application against a malware blacklist, and/or checking the application against a malware whitelist. In some embodiments, the emulation may include an emulation of a computing platform with sufficient similarity to the mobile computing platform to detect a malicious behavior in the application when executed in the emulation of the mobile computing platform.

In some examples, an additional computer-implemented method for detecting malware on mobile platforms may include (1) receiving an application from a mobile computing platform, (2) receiving a request from the mobile computing platform to evaluate the application for malware, (3) receiving emulation information from the mobile computing platform, the emulation information relating to emulating the mobile computing platform, (4) evaluating the application for malware by executing the application within an emulation of the mobile computing platform based on the emulation information, and (5) transmitting a result of evaluating the application for malware to the mobile computing platform.

In one example, receiving the emulation information may include receiving information that identifies the mobile computing platform. In some examples, evaluating the application for malware may include performing a behavioral analysis on the application executing within the emulation of the mobile computing platform. Additionally or alternatively, evaluating the application for malware may include scanning the application for at least one malware signature, checking the application against a malware blacklist, and/or checking the application against a malware whitelist.

In some examples, the emulation may include an emulation of a computing platform with sufficient similarity to the mobile computing platform to detect a malicious behavior in the application when executed in the emulation of the mobile computing platform. In one example, evaluating the application for malware may include selecting an emulator compatible with the application by selecting an emulator providing cross-platform compatibility with the mobile computing platform.

In one embodiment, a system for implementing the above-described method may include an identification module programmed to identify an application on a mobile computing platform subject to a malware evaluation. The system may also include a transmission module programmed to transmit the application to a security server. The transmission module may also be programmed to provide emulation information to the security server, the emulation information relating to emulating the mobile computing platform. The system may also include a result module programmed to receive a result of the malware evaluation as performed by the security server, the malware evaluation including the security server using the emulation information to execute the application within an emulation of the mobile computing platform. The system may additionally include a performing module programmed to perform a security action based on the result of the malware evaluation. The system may further include at least one processor configured to execute the identification module, the transmission module, the result module, and the performing module.

As will be explained in greater detail below, by uploading suspect applications to a cloud-based security system where the suspect applications may be run in mobile-platform emulators and inspected for suspect behaviors, the systems and methods described herein may efficiently and effectively scan applications on mobile computing platforms for malware (e.g., using behavioral heuristic techniques) without taxing the resources of the mobile computing platforms. Furthermore, the systems and methods described herein may provide security against malware while still conforming to strict mobile platform restrictions that may otherwise cripple mobile computing security systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 1:
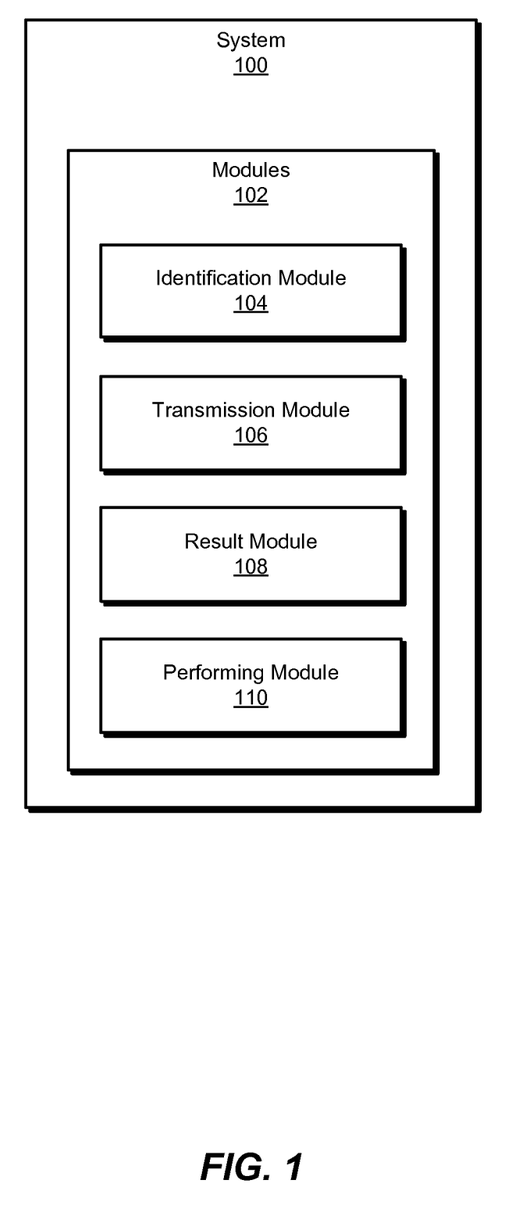
FIG. 1 is a block diagram of an exemplary system for detecting malware on mobile platforms.
Figure 2:
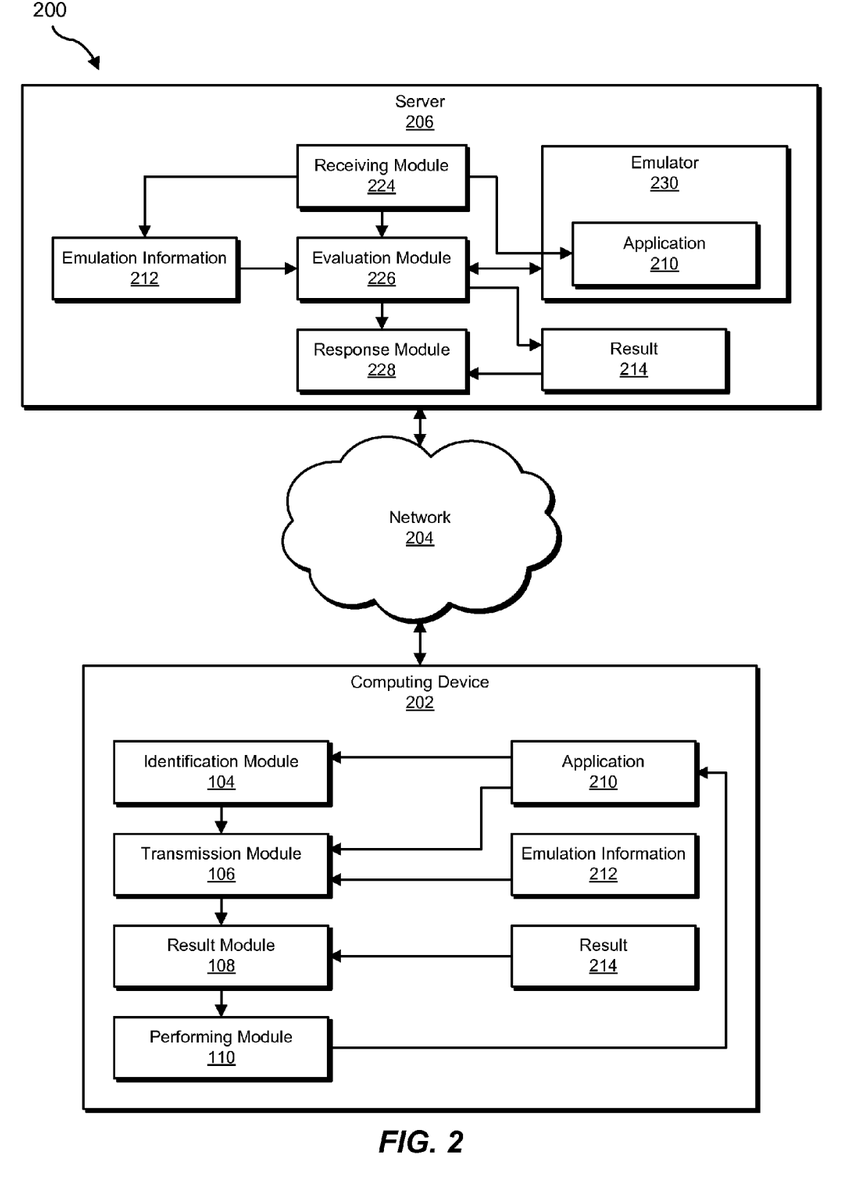
FIG. 2 is a block diagram of an exemplary system for detecting malware on mobile platforms.

The following will provide, with reference to FIGS. 1-2, detailed descriptions of exemplary systems for detecting malware on mobile platforms. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting malware on mobile platforms. As illustrated in this figure, exemplary system 100 may include one or more modules 102 for performing one or more tasks. For example, and as will be explained in greater detail below, exemplary system 100 may include an identification module 104 programmed to identify an application on a mobile computing platform subject to a malware evaluation. Exemplary system 100 may also include a transmission module 106 programmed to transmit the application to a security server. Transmission module 106 may also be programmed to provide emulation information to the security server, the emulation information relating to emulating the mobile computing platform.

In addition, and as will be described in greater detail below, exemplary system 100 may include a result module 108 programmed to receive a result of the malware evaluation as performed by the security server, the malware evaluation including the security server using the emulation information to execute the application within an emulation of the mobile computing platform. Exemplary system 100 may additionally include a performing module 110 programmed to perform a security action based on the result of the malware evaluation. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, exemplary system 200 may include a computing device 202 in communication with a server 206 via a network 204. In one example, computing device 202 may include an application 210 subject to a malware evaluation.

In one embodiment, identification module 104, transmission module 106, result module 108, and/or performing module 110 from FIG. 1 may, when executed by at least one processor of computing device 202, facilitate computing device 202 in detecting malware on mobile platforms. For example, and as will be described in greater detail below, identification module 104 may be programmed to identify application 210 subject to a malware evaluation on computing device 202. Transmission module 106 may be programmed to transmit application 210 to a server 206. Transmission module 106 may also be programmed to provide emulation information 212 to server 206. Emulation information 212 may relate to emulating computing device 202. Result module 108 may be programmed to receive a result 214 of the malware evaluation as performed by the security server, the malware evaluation including the security server using the emulation information to execute the application within an emulator 230 of the mobile computing platform. Performing module 110 may be programmed to perform a security action (e.g., on application 210) based on result 214 of the malware evaluation.

Computing device 202 generally represents any type or form of computing device capable of reading computer-executable instructions. Examples of computing device 202 include, without limitation, cellular phones, personal digital assistants (PDAs), tablet devices, e-book readers, laptops, multimedia players, embedded systems, combinations of one or more of the same, exemplary computing system 510 in FIG. 5, or any other suitable computing device.

Server 206 generally represents any type or form of computing device that is capable of detecting malware, emulating mobile computing platforms, and/or provisioning emulators of mobile computing platforms. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
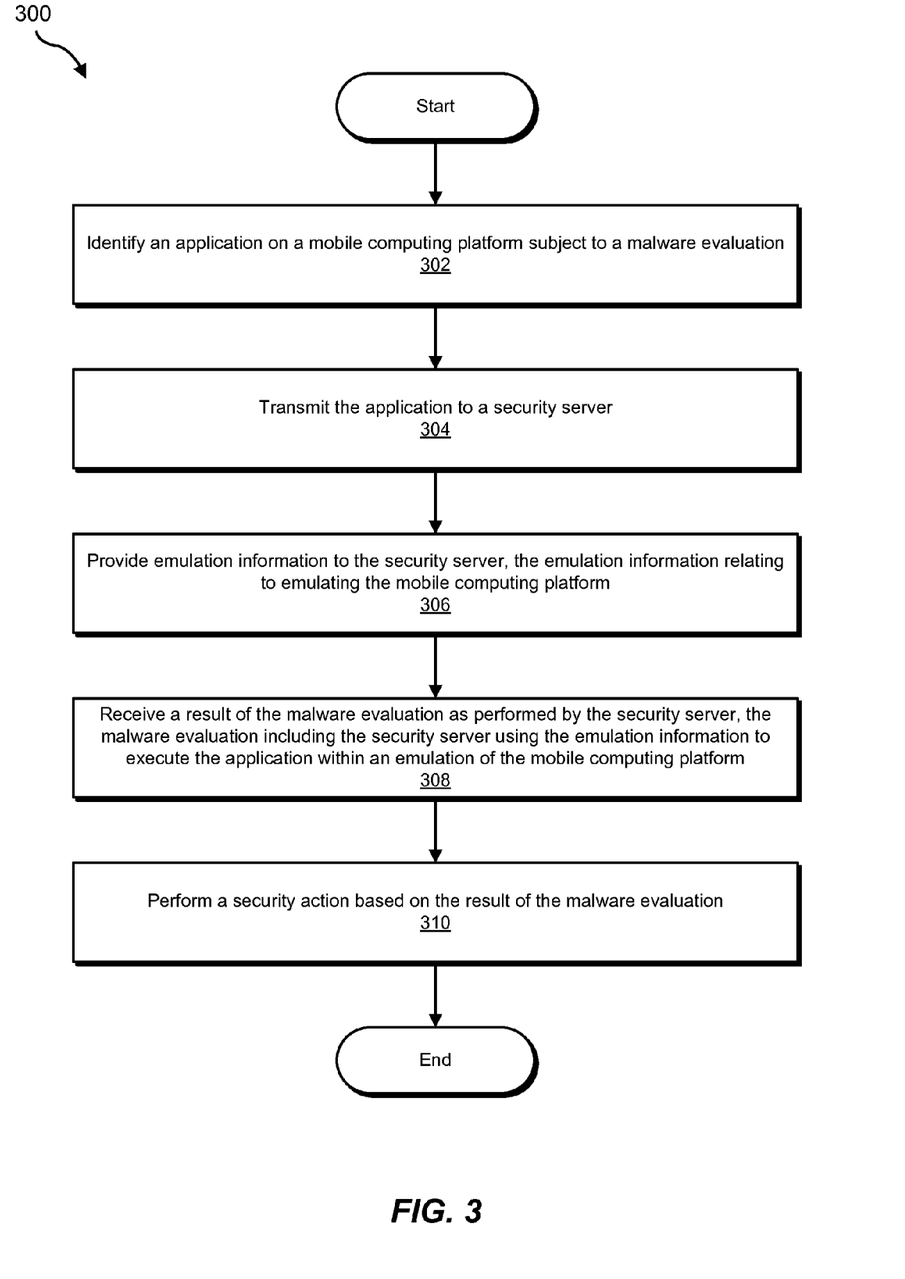
FIG. 3 is a flow diagram of an exemplary method for detecting malware on mobile platforms.

FIG. 3 is a flow diagram of an exemplary computer-implemented method 300 for detecting malware on mobile platforms. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application on a mobile computing platform subject to a malware evaluation. For example, at step 302 identification module 104 may, as part of computing device 202 in FIG. 2, identify application 210 subject to a malware evaluation on computing device 202.

As used herein, the term "application" may refer to any file that includes and/or may be used to generate one or more computer-executable instructions. Examples of applications may include, without limitation, executable files, library files, data files configured to exploit a program when read and/or interpreted, archive files (e.g., compression files) including a representation of one or more files, plug-in files, and script files.

As used herein, the phrase "mobile computing platform" may refer to any computing device, software framework, and/or combination thereof. As previously noted, a mobile computing platform may include a mobile phone, a tablet computer, an e-book reader, a personal digital assistant, and the like. The phrase "mobile computing platform" may also generally refer to any other portable device that may have wireless connectivity to the Internet. Mobile computing platforms may include GPS devices, messaging devices, and various other types of mobile devices.

In some examples, the mobile computing platform may include a restricted platform that may interfere with some traditional methods for computing security. For example, the mobile computing platform may restrict modifications to system-level and/or base functionality. In some examples, the restricted mobile platform may limit the ability of third-party software to inspect the behavior of other applications, such as network traffic, file creation and/or modification, resource usage, and/or execution context. The restricted mobile platform may enforce these limitations as a part of the hardware of a mobile computing system and/or as a part of the operating system of a mobile computing device. In some examples, the restricted mobile platform may extend to an application store with exclusive privileges to allow certain configurations and/or software installations on the mobile computing system. In some examples, restrictions on the mobile platform may be enforced by decisions regarding whether to make an application available and/or visible in the application store. In some examples, restrictions on the mobile platform may hamper the use of third-party security software on the mobile platform by making use of the third-party security software difficult and/or costly, and/or by reducing features and/or the reliability of the mobile platform when third-party security software is installed.

In various examples, the mobile computing platform may include limited computing resources such that evaluating malware on the mobile computing platform may degrade the performance of the mobile computing platform. For example, the mobile computing platform may include limited processing power and/or limited volatile memory.

The application may be subject to the malware evaluation in any of a variety of contexts. For example, identification module 104 may identify the application when the application is downloaded to the mobile computing platform. In some examples, identification module 104 may determine that the source of the downloaded application is untrusted and may identify that the application is subject to the malware evaluation based on the source being untrusted. Additionally or alternatively, identification module 104 may identify the application during a periodic security scan of the mobile computing platform. In some examples, identification module 104 may determine that the application is untrusted and/or that the security status of the application is unknown. For example, identification module 104 may determine that one or more malware detection techniques could not be applied to the application and/or were inconclusive when applied to the application.

In some examples, identification module 104 may identify the application on the mobile computing platform by identifying one or more files corresponding to the application stored on the mobile computing platform. Additionally or alternatively, identification module 104 may identify an identifier of the application on the mobile computing platform. For example, identification module 104 may identify the application identifier in an attempt to download the application to the mobile computing platform.

Returning to FIG. 3, at step 304 one or more of the systems described herein may transmit the application to a security server. For example, at step 304 transmission module 106 may, as part of computing device 202 in FIG. 2, transmit application 210 to a server 206.

The security server may operate in any of a variety of contexts. For example, the security server may operate as part of a computing cluster and/or cloud. Additionally or alternatively, the security server may include a virtual server. In some examples, transmission module 106 may transmit the application to the security server by transmitting the application to a security service configured to use one or more servers.

Transmission module 106 may transmit the application to the security server in any of a variety of ways. For example, transmission module 106 may transmit a copy of the application, a copy of an executable file and/or library within the application, and/or an archive or package of the application to the security server. In some examples, transmission module 106 may transmit the application to the security server by transmitting enough information for the security server to receive and/or obtain a copy of the application. For example, transmission module 106 may transmit a source of the application to the security server (e.g., so that the security server can retrieve a copy of the application). Additionally or alternatively, transmission module 106 may transmit an identifier of the application to the security server. In some examples, transmission module 106 may also transmit a request to the security server to evaluate the application for malware. In one example, transmission module 106 may implicitly request that the security server evaluate the application for malware by transmitting the application to the security server.

Figure 4:
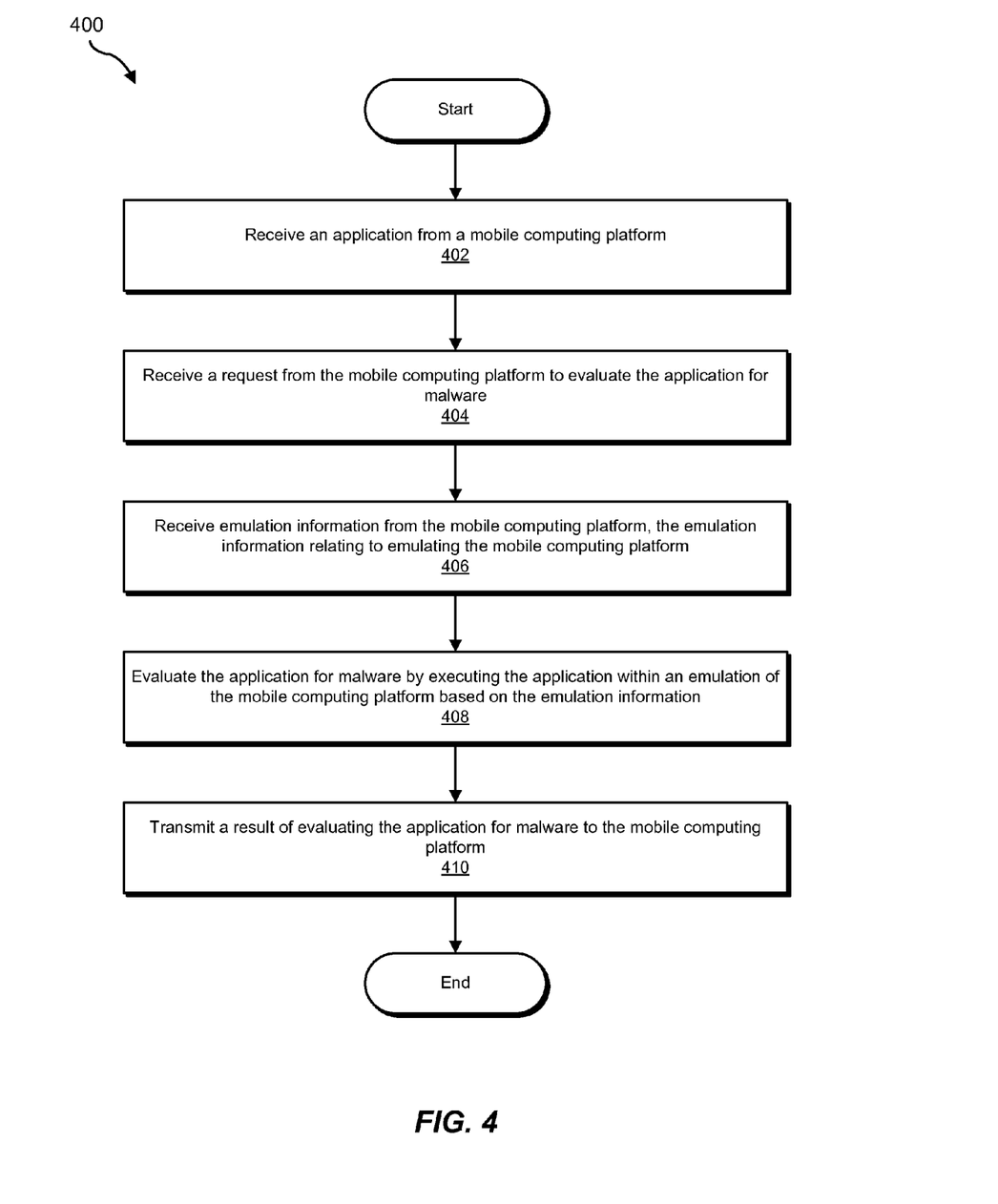
FIG. 4 is a flow diagram of an exemplary method for detecting malware on mobile platforms.

FIG. 4 is a flow diagram of an exemplary computer-implemented method 400 for detecting malware on mobile platforms. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 510 in FIG. 5, and/or portions of exemplary network architecture 600 in FIG. 6.

As illustrated in FIG. 4, at step 402 one or more of the systems described herein may receive an application from a mobile computing platform. For example, at step 402 a receiving module 224 may, as part of server 206 in FIG. 2, identify receive application 210 from computing device 202.

Receiving module 224 may receive the application from the mobile computing platform in any of a variety of ways. For example, receiving module 224 may receive a copy of the application, a copy of an executable file and/or library within the application, and/or an archive or package of the application from the mobile computing platform. In some examples, receiving module 224 may receive the application from the mobile computing platform by receiving enough information to construct and/or obtain a copy of the application. For example, receiving module 224 may receive a source of the application from the mobile computing platform (e.g., a source from which the mobile computing platform has retrieved and/or has been directed to retrieve the application). In this example, receiving module 224 may then retrieve the application from the source. Additionally or alternatively, receiving module 224 may receive an identifier of the application from the mobile computing platform.

At step 404 one or more of the systems described herein may receive a request from the mobile computing platform to evaluate the application for malware. For example, at step 404 receiving module 224 may, as part of server 206 in FIG. 2, receive a request to evaluate application 210 from computing device 202.

Receiving module 224 may receive the request to evaluate the application for malware in any suitable manner. For example, receiving module 224 may receive a message from the mobile computing platform referencing the application and requesting a security assessment of the application. Additionally or alternatively, the fact that the mobile computing platform has sent the application may constitute the request. Accordingly, in this example, receiving module 224 may receive the request simply by receiving the application from the mobile computing platform.

Returning to FIG. 3, at step 306 one or more of the systems described herein may provide emulation information to the security server, the emulation information relating to emulating the mobile computing platform. For example, at step 306 transmission module 106 may, as part of computing device 202 in FIG. 2, provide emulation information 212 relating to emulating computing device 202 to server 206.

As used herein, the term "emulation" may refer to any technique and/or combination of techniques for emulation, simulation, and/or virtualization useful for determining the effects of an application on the emulated platform. Accordingly, as used herein, the phrase "emulation information" may refer to any information useful for selecting, provisioning, configuring, and/or generating an emulator, a simulator, and/or a virtualization for a given computing platform.

Transmission module 106 may provide the emulation information to the security server in any of a variety of ways. For example, transmission module 106 may provide information identifying the mobile computing platform to the security server. For example, transmission module 106 may provide a device model identifier and/or an operating system version identifier to the security server. In some examples, transmission module 106 may provide the information identifying the mobile computing platform simply by communicating with the security server. For example, the security server may identify a communication from the mobile computing platform and determine that the communication is from the mobile computing platform based on a credential provided by the mobile computing platform. The security server may then look up the credential in a database to determine hardware and/or software details of the mobile computing platform.

In some examples, transmission module 106 may provide information about a processor of the mobile computing platform. Additionally or alternatively, transmission module 106 may provide information about system configuration settings of the mobile computing platform. In some examples, transmission module 106 may provide information relating to changes made to the mobile computing platform from a default state (e.g., hardware added to and/or removed from the mobile computing platform, software installed on and/or removed from the mobile computing platform, system configuration changes made to the mobile computing platform, etc.).

As illustrated in FIG. 4, at step 406 one or more of the systems described herein may receive emulation information from the mobile computing platform, the emulation information relating to emulating the mobile computing platform. For example, at step 406 receiving module 224 may, as part of server 206 in FIG. 2, receive emulation information 212 relating to emulating computing device 202 from computing device 202.

Receiving module 224 may receive the emulation information in any of a variety of forms. For example, receiving module 224 may receive information identifying the mobile computing platform. For example, receiving module 224 may receive a device model identifier and/or an operating system version identifier of the mobile computing platform. In some examples, receiving module 224 may receive the information identifying the mobile computing platform simply by receiving a communication from the mobile computing platform. For example, receiving module 224 may identify a communication from the mobile computing platform and determine that the communication is from the mobile computing platform based on a credential provided by the mobile computing platform. Receiving module 224 may then look up the credential in a database to determine hardware and/or software details of the mobile computing platform.

In some examples, receiving module 224 may receive information about a processor of the mobile computing platform. Additionally or alternatively, receiving module 224 may receive information about system configuration settings of the mobile computing platform. In some examples, receiving module 224 may receive information relating to changes made to the mobile computing platform from a default state (e.g., hardware added to and/or removed from the mobile computing platform, software installed on and/or removed from the mobile computing platform, system configuration changes made to the mobile computing platform, etc.).

Returning to FIG. 3, at step 308 one or more of the systems described herein may receive a result of the malware evaluation as performed by the security server, the malware evaluation including the security server using the emulation information to execute the application within an emulation of the mobile computing platform. For example, at step 308 result module 108 may, as part of computing device 202 in FIG. 2, receive a result 214 of the malware evaluation as performed by the security server, the malware evaluation including the security server using the emulation information to execute the application within an emulator 230 of the mobile computing platform.

Result module 108 may receive any of a variety of information as the result. In some examples, result module 108 may receive an assessment that the application includes malware. Additionally or alternatively, result module 108 may receive an assessment that the application is exploitable and/or exploited by malware. Additionally or alternatively, result module 108 may receive information relating to the behavior of the application when executed on the mobile computing platform. For example, result module 108 may receive information relating to resources consumed by the application, files created and/or modified by the application, configurations modified by the application, and/or communications transmitted by the application.

The malware evaluation may include any of a variety of techniques for determining whether the application poses a security threat. For example, the malware evaluation may include the security server performing a behavioral analysis on the application executing within the emulation of the mobile computing platform. In this example, the malware evaluation may include monitoring the application within the emulation to determine whether the application performs suspicious and/or harmful actions. For example, the malware evaluation may include monitoring the emulation of the mobile computing system executing the application to identify files created via the emulation, files changed via the emulation, files accessed via the emulation, resources consumed via the emulation, configurations changed via the emulation, communications attempted within the emulation, etc.

In some examples, the malware evaluation may also include scanning the application for at least one malware signature (e.g., searching a file of the application for one or more strings and/or characteristics indicating the presence of malware). For example, before emulating the mobile computing platform and/or performing a behavioral analysis on the application, the malware evaluation may include scanning the application for a malware signature. In this manner, the malware evaluation may attempt to avoid a potentially unnecessary and expensive behavioral analysis (e.g., by determining that the application includes malware without performing the emulation and/or behavioral analysis). Likewise, in some examples the malware evaluation may include checking the application against a malware blacklist (e.g., checking metadata of a file of the application, such as a checksum of the file, a filename of the file, etc., against the malware blacklist) and/or a malware whitelist to attempt to make a less resource-intensive determination before emulating the mobile computing platform and/or performing the behavioral analysis.

The emulation may include any configuration suitable for evaluating the application. For example, the emulation may entail the emulation of a computing platform with sufficient similarity to the mobile computing platform to detect a malicious behavior in the application when executed in the emulation of the mobile computing platform. For example, the emulation may include an emulation of the processor of the mobile computing platform and a simulation of a common default and/or stock software configuration related to the processor and/or the mobile computing platform.

As illustrated in FIG. 4, at step 408 one or more of the systems described herein may evaluate the application for malware by executing the application within an emulation of the mobile computing platform based on the emulation information. For example, at step 408 an evaluation module 226 may, as part of server 206 in FIG. 2, evaluate application 210 for malware by executing application 210 within emulator 230 configured to emulate computing device 202 based on emulation information 212.

Evaluation module 226 may evaluate the application using any of a variety of techniques for determining whether the application poses a security threat. For example, evaluation module 226 may perform a behavioral analysis on the application executing within the emulation of the mobile computing platform. In this example, evaluation module 226 may monitor the application executed within the emulation to determine whether the application performs suspicious and/or harmful actions. For example, evaluation module 226 may monitor the emulation of the mobile computing system executing the application to identify files created via the emulation, files changed via the emulation, files accessed via the emulation, resources consumed via the emulation, configurations changed via the emulation, communications attempted within the emulation, etc.

In some examples, evaluation module 226 may also scan the application for at least one malware signature (e.g., searching a file of the application for one or more strings and/or characteristics indicating the presence of malware). For example, before emulating the mobile computing platform and/or performing a behavioral analysis on the application, evaluation module 226 may scan the application for a malware signature. In this manner, evaluation module 226 may attempt to avoid a potentially unnecessary and expensive behavioral analysis (e.g., by determining that the application includes malware without performing the emulation and/or behavioral analysis). Likewise, in some examples evaluation module 226 may check the application against a malware blacklist (e.g., checking metadata of a file of the application, such as a checksum of the file, a filename of the file, etc., against the malware blacklist) and/or a malware whitelist to attempt to make a less resource-intensive determination before emulating the mobile computing platform and/or performing the behavioral analysis.

Evaluation module 226 may use any emulation configuration suitable for evaluating the application. For example, the emulation may include the emulation of a computing platform with sufficient similarity to the mobile computing platform to detect a malicious behavior in the application when executed in the emulation of the mobile computing platform. For example, the emulation may include an emulation of the processor of the mobile computing platform and a simulation of a common default and/or stock software configuration related to the processor and/or the mobile computing platform. In some examples, evaluation module 226 may inspect the application to create a list of instructions that are executed by the application in order to identify a suitable emulator.

Evaluation module 226 may effectuate the emulation in any of a variety of ways. For example, evaluation module 226 may select an emulator from a repository of available emulators. Additionally or alternatively, evaluation module 226 may configure and/or generate an emulator using the emulation information. For example, evaluation module 226 may select a partial emulator of the mobile computing platform and provision the partial emulator with software necessary to fully emulate the mobile computing platform. In some examples, evaluation module 226 may select an emulator compatible with the application by selecting an emulator providing cross-platform compatibility with the mobile computing platform. For example, a repository of emulators available to evaluation module 226 may not include an exact match of the mobile computing platform. Accordingly, evaluation module 226 may identify an emulator of a computing platform that is cross-compatible with the mobile computing platform.

Evaluation module 226 may emulate the mobile computing platform at any level of abstraction suitable for analyzing the behavior of the application. For example, evaluation module 226 may emulate components of the mobile computing platform where the external behavior of the components is important, and provide the emulated components as resources to a virtualization in order to simulate the entire mobile computing platform (e.g., both hardware and software layers). In this manner, evaluation module 226 may inspect the internal behavior of simulation where relevant to assessing the application.

As illustrated in FIG. 4, at step 410 one or more of the systems described herein may transmit a result of evaluating the application for malware to the mobile computing platform. For example, at step 410 response module 228 may, as part of server 206 in FIG. 2, transmit result 214 of the evaluation of application 210 to computing device 202.

Response module 228 may transmit any of a variety of information as the result. In some examples, response module 228 may transmit an assessment that the application includes malware. Additionally or alternatively, response module 228 may transmit an assessment that the application is exploitable and/or exploited by malware. Additionally or alternatively, response module 228 may transmit information relating to the behavior of the application when executed on the mobile computing platform. For example, response module 228 may transmit information relating to resources consumed by the application, files created and/or modified by the application, configurations modified by the application, and/or communications transmitted by the application.

In some examples, response module 228 may associate the result of the emulation and/or the evaluation with an identifier of the application in order to preserve the results. These results may then be reused, provided to a security vendor, and/or distributed to an application vendor. After step 410, method 400 may terminate.

Returning to FIG. 3, at step 310 one or more of the systems described herein may perform a security action based on the result of the malware evaluation. For example, at step 310 performing module 110 may, as part of computing device 202 in FIG. 2, perform a security action (e.g., on application 210) based on result 214 of the malware evaluation.

Performing module 110 may perform any suitable security action based on the result. For example, performing module 110 may delete the application, quarantine the application (e.g., prevent the application from executing, isolating the effects of the application, and/or reducing the privileges of the application), and/or report the application (e.g., to a user, an administrator, and/or a security vendor). In another example, the application may not yet be fully downloaded to the mobile computing platform. In this example, performing module 110 may terminate the download attempt.

In some examples, performing module 110 may use the result to inform a further security assessment of the application. For example, the result may describe one or more behaviors of the application when emulated. Performing module 110 may then use the behavioral information in context to make a security determination for the application. After step 310, method 300 may terminate.

As explained above, by uploading suspect applications to a cloud-based security system where the suspect applications may be run in mobile-platform emulators and inspected for suspect behaviors, the systems and methods described herein may efficiently and effectively scan applications on mobile computing platforms for malware (e.g., using behavioral heuristic techniques) without taxing the resources of the mobile computing platforms. Furthermore, the systems and methods described herein may provide security against malware while still conforming to strict mobile platform restrictions that may otherwise cripple mobile computing security systems.

Figure 5:
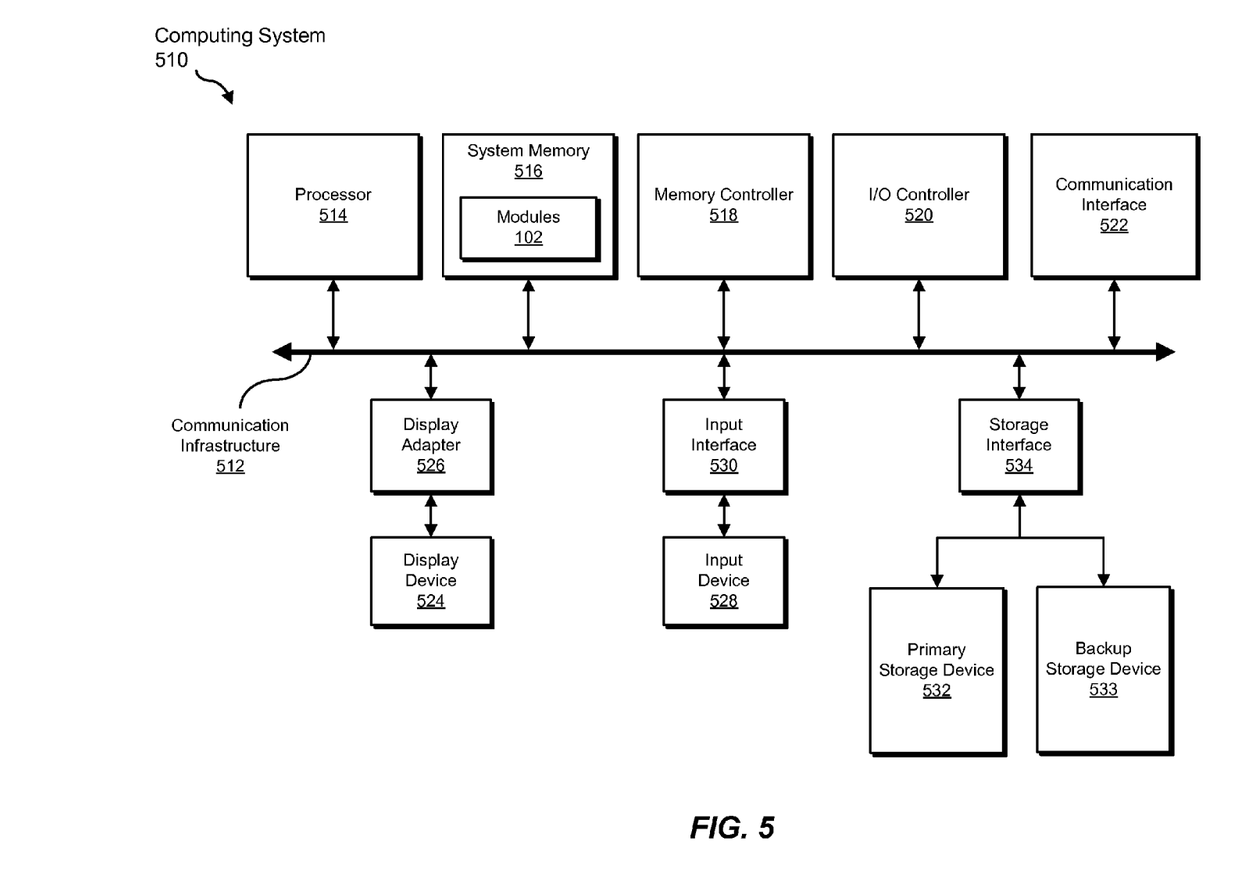
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, transmitting, receiving, providing, performing, scanning, checking, evaluating, executing, and/or selecting steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
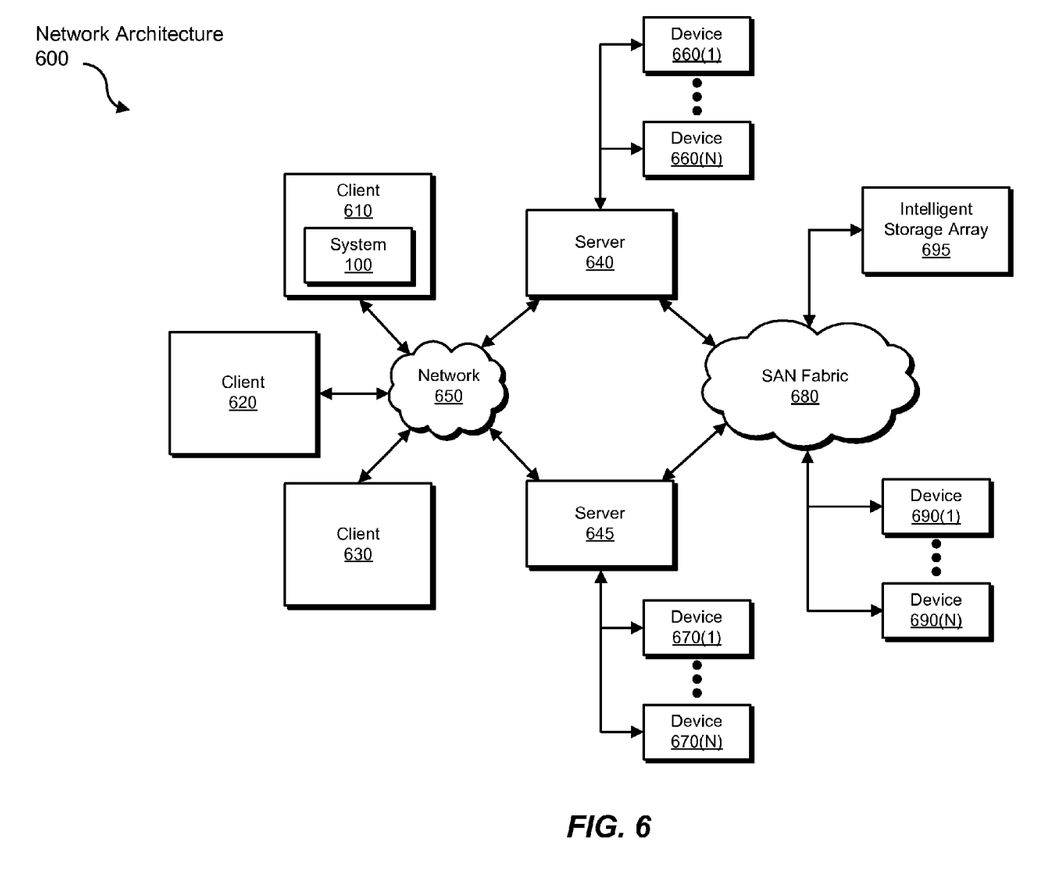
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, transmitting, receiving, providing, performing, scanning, checking, evaluating, executing, and/or selecting steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting malware on mobile platforms.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a mobile computing device into a secure mobile computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A non-transitory computer-readable-storage medium comprising one or more computer-executable instructions that, when executed by at least one processor of a computing device, cause the computing device to:
   receive an application;
   receive a request from a mobile computing platform to evaluate the application for malware, wherein the mobile computing platform places a limitation on an ability of third-party software to inspect application behavior;
   receive emulation information from the mobile computing platform, the emulation information relating to emulating the mobile computing platform, the emulation information comprising an emulation credential;
   look up the emulation credential in a database to retrieve hardware and/or software details of the mobile computing platform;
   evaluate the application for malware by:
      executing the application within an emulation of the mobile computing platform based on the hardware and/or software details of the mobile computing platform retrieved from the database by looking up the emulation credential received from the mobile computing platform in the database;
      circumventing the limitation on the ability of third-party software to inspect application behavior by performing a behavioral analysis on the application executing within the emulation of the mobile computing platform;
   transmit a result of evaluating the application for malware to the mobile computing platform.

2. The non-transitory computer-readable-storage medium of claim 1, wherein receiving the emulation information comprises receiving information that identifies the mobile computing platform.

3. The non-transitory computer-readable-storage medium of claim 1, wherein evaluating the application comprises performing a behavioral analysis on the application executing within the emulation of the mobile computing platform.

4. The non-transitory computer-readable-storage medium of claim 1, wherein the emulation of the mobile computing platform comprises an emulation of a computing platform with sufficient similarity to the mobile computing platform to detect a malicious behavior in the application when executed in the emulation of the mobile computing platform.

5. The non-transitory computer-readable-storage medium of claim 1, wherein the one or more computer-executable instructions, when executed by at least one processor of a computing device, further cause the computing device to select an emulator compatible with the application by selecting an emulator providing cross-platform compatibility with the mobile computing platform.

6. A computer-implemented method for detecting malware on mobile platforms, at least a portion of the method being performed by a computing device comprising at least one processor, the method comprising:
   receiving an application;
   receiving a request from a mobile computing platform to evaluate the application for malware, wherein the mobile computing platform places a limitation on an ability of third-party software to inspect application behavior;
   receiving emulation information from the mobile computing platform, the emulation information relating to emulating the mobile computing platform, the emulation information comprising an emulation credential;
   looking up the emulation credential in a database to retrieve hardware and/or software details of the mobile computing platform;
   evaluating the application for malware by:
      executing the application within an emulation of the mobile computing platform based on the hardware and/or software details of the mobile computing platform retrieved from the database by looking up the emulation credential received from the mobile computing platform in the database;
      circumventing the limitation on the ability of third-party software to inspect application behavior by performing a behavioral analysis on the application executing within the emulation of the mobile computing platform;
   transmitting a result of evaluating the application for malware to the mobile computing platform.

7. The computer-implemented method of claim 6, wherein receiving the emulation information comprises receiving information that identifies the mobile computing platform.

8. The computer-implemented method of claim 6, wherein evaluating the application comprises performing a behavioral analysis on the application executing within the emulation of the mobile computing platform.

9. The computer-implemented method of claim 6, wherein the emulation of the mobile computing platform comprises an emulation of a computing platform with sufficient similarity to the mobile computing platform to detect a malicious behavior in the application when executed in the emulation of the mobile computing platform.

10. The computer-implemented method of claim 6, further comprising selecting an emulator compatible with the application by selecting an emulator providing cross-platform compatibility with the mobile computing platform.

11. The computer-implemented method of claim 6, wherein the evaluating the application for malware further comprises at least one of:
   scanning the application for at least one malware signature;
   checking the application against a malware blacklist;
   checking the application against a malware whitelist.

12. A system for detecting malware on mobile platforms, the system comprising:
   a receiving module programmed to:
      receive an application;
      receive a request from a mobile computing platform to evaluate the application for malware, wherein the mobile computing platform places a limitation on an ability of third-party software to inspect application behavior;
      receive emulation information from the mobile computing platform, the emulation information relating to emulating the mobile computing platform, the emulation information comprising an emulation credential;
      look up the emulation credential in a database to retrieve hardware and/or software details of the mobile computing platform;

an evaluation module programmed to evaluate the application for malware by:
  executing the application within an emulation of the mobile computing platform based on the hardware and/or software details of the mobile computing platform retrieved from the database by looking up the emulation credential received from the mobile computing platform in the database;
  circumventing the limitation on the ability of third-party software to inspect application behavior by performing a behavioral analysis on the application executing within the emulation of the mobile computing platform;
a transmission module programmed to transmit a result of evaluating the application for malware to the mobile computing platform;
at least one processor configured to execute the receiving module, the evaluation module, and the transmission module.

13. The system of claim 12, wherein the receiving module is programmed to receive the application from the mobile computing platform.

14. The system of claim 12, wherein the receiving module is programmed to:
  receive information that identifies a source of the application from the mobile computing platform, where the mobile computing platform had previously received the application from the source;
  receive the application from the source using the information that identifies the source.

15. The system of claim 12, wherein the receiving module is programmed to receive an identifier of the application from the mobile computing platform.

16. The system of claim 12, wherein the receiving module is programmed to receive the emulation information by receiving information that identifies the mobile computing platform.

17. The system of claim 12, wherein the evaluation module is programmed to evaluate the application by performing a behavioral analysis on the application executing within the emulation of the mobile computing platform.

18. The system of claim 12, wherein the emulation has sufficient similarity to the mobile computing platform for the evaluation module to detect a malicious behavior in the application when executed in the emulation of the mobile computing platform.

19. The system of claim 12, wherein the evaluation module is further programmed to select an emulator compatible with the application by selecting an emulator providing cross-platform compatibility with the mobile computing platform.

20. The system of claim 12, wherein the evaluation module is further programmed to evaluate the application for malware by at least one of:
  scanning the application for at least one malware signature;
  checking the application against a malware blacklist;
  checking the application against a malware whitelist.

* * * * *